April 27, 1965     E. W. MELL     3,180,248

BARBECUE DEVICE WITH MOVABLE HOOD

Filed Oct. 15, 1963

INVENTOR.
ERIC W. MELL
BY
*Irwin C. Alter*
ATTORNEY

United States Patent Office 3,180,248
Patented Apr. 27, 1965

3,180,248
BARBECUE DEVICE WITH MOVABLE HOOD
Eric W. Mell, Chicago, Ill., assignor, by mesne assignments, to Tonka Toys Inc., Mound, Minn., a corporation of Minnesota
Filed Oct. 15, 1963, Ser. No. 316,353
8 Claims. (Cl. 99—421)

This invention relates to a barbecue device and more particularly to a barbecue device having a round fire tray which has hoods over its fire tray, one of which being selectively movable to expose a portion of the fire tray to a predetermined degree.

The idea of having a movable hood to cover or expose a round fire tray is in itself old. Prior art devices have taught the use of removable hoods for round fire trays, they, however, having many disadvantages. For instance, when these prior art hoods were removed to uncover a fire tray, the hoods were lost or misplaced or not accessible because they were not an integral part of the barbecue device. Still further, these removable hoods that were an integral part of the barbecue device did not have the means for selectively determining the degree to which a round fire tray would be exposed. The barbecue devices were merely covered or uncovered, there being no way that a predetermined amount of exposure of a round fire tray could be attained.

My barbecue device includes a novel hide-away hood means which is integrally built into my device and it can be moved to expose or cover a round fire tray to a predetermined extent without being detached and with a minimum of inconvenience thereby obviating the primary disadvantages inherent in prior art devices.

It is therefore an object of this invention to provide a new and improved barbecue device.

It is still further an object of this invention to provide a novel means for covering or exposing the fire tray of a barbecue device a predetermined amount.

Even still further it is an object of this invention to provide a barbecue device which has a hood means for protecting the fire tray from outside elements.

Still even further it is an object of this invention to provide an integral hood means for covering the fire tray of a barbecue device which can be moved to expose the fire tray to a predetermined extent without being removed therefrom.

Still even further it is an object of this invention to provide a barbecue device having a round fire tray, a food holding spit portion and a hood portion that can be moved to expose or cover the fire tray, and said food holding spit portion being disposed in a position to hold food over said fire tray regardless of whether said fire tray is covered or exposed.

Other and further objects of this invention will become more readily apparent when reading this specification along with viewing the drawing wherein.

Figure 1:
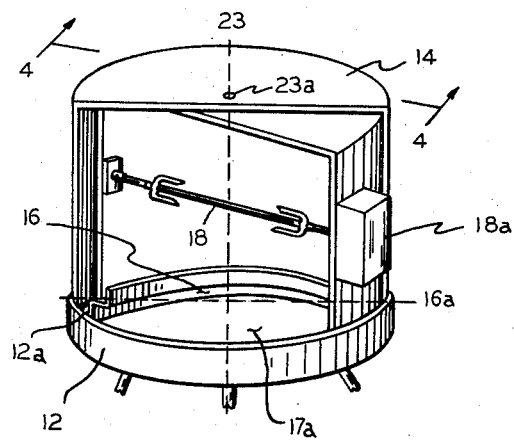
FIGURE 1 is a pictorial view of my invention incorporated in a barbecue device wherein the hide-away hood is shown in its open position.

Referring more particularly to the drawing wherein like characters of reference indicate corresponding members thoughout the drawing, I have illustrated a barbecue device 10 having a round fire tray 12 with a circular top 12A. A hood portion such as the semi-cylindrical hood portion 14 is attached to a portion of the circular top 12A as shown in FIGURE 1. The semi-cylindrical hood portion has a closed end 14A and a semi-cylindrical bottom 14B attached to a portion of the circular top to form a permanently closed fire tray portion 16. The closed fire tray portion 16 is bounded by the projection of the top of the hood portion on the fire tray portion, the dotted line 16A representing the division between the closed fire tray portion 16 and the open fire tray portion 17A.

A hide-away hood portion 20 having a semi-cylindrical shape is sized to fit within the closed hood portion 14 and is pivotally mounted thereto at the coincident vertical axes 23 of both of the hoods by fastening means 23A. The hide-away hood portion has a rotatably driven food holding spit means 18 rotatably mounted on the walls therein and anti-friction means such as the wheels 11 rotatably mounted on the bottom 20B thereof. A driving means such as a motor 18A is associated with the food holding spit means 18.

Figure 5:
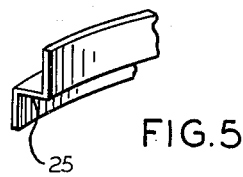
FIGURE 5 is a pictorial view of a portion of the channel member employed in my invention.
Figure 4:
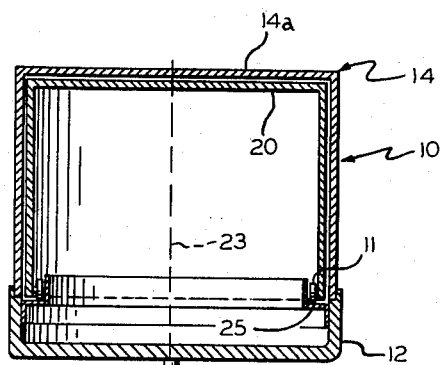
FIGURE 4 is a sectional view taken along the line 4—4 in FIGURE 1 and looking in the direction of the arrows.
Figure 6:
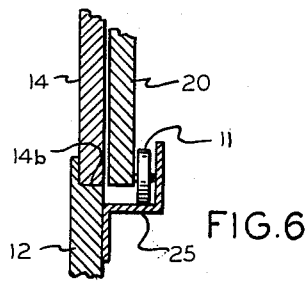
FIGURE 6 is an enlarged view of a portion of FIGURE 4 illustrating the relationship between the hood portions and the fire tray of my invention.

Receiving means such as the channel member 25 is attached to a portion of the inner periphery of the fire tray to receive the wheels 11 therein thereby supporting the hide-away hood so that it can be slidably moved thereon as illustrated in FIGURES 4, 5 and 6. The hide-away hood portion is sized to fit within the fixed semi-cylindrical hood portion and it is positioned with respect to the channel member 25 so that the sides and tops of both hood portions are parallel. The two hoods therefore have a similar geometric configuration with the hide-away hood being smaller.

Figure 2:
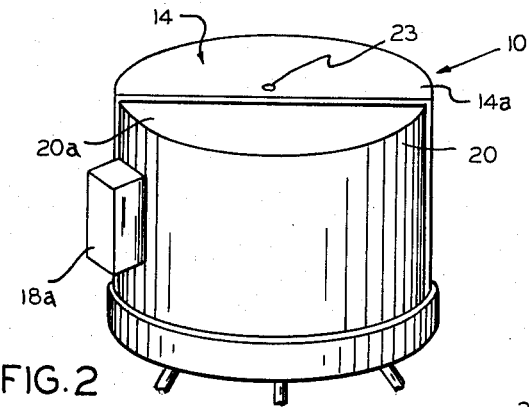
FIGURE 2 is a pictorial view of FIGURE 1 showing the hide-away hood in its closed position.
Figure 3:
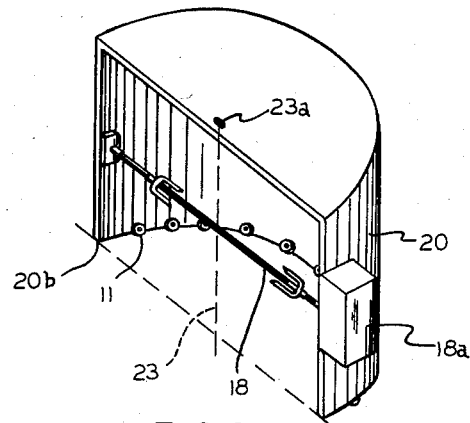
FIGURE 3 is a pictorial view illustrating the hide-away hood disassembled from the barbecue device.

Channel member 25 is disposed to enable the rotatably mounted hide-away hood portion 20 to be supported while it is rotatably moved a predetermined amount to completely close the open fire tray portion 17A as illustrated in FIGURE 2 or any portion thereof. Therefore when it is desired to expose the open fire tray portion, the hide-away hood portion is rotated to the position shown in FIGURE 1. Accordingly, as mentioned at the outset the principal object of providing hood portions that can expose or cover a round fire tray a preselected amount without being removed from the fire tray is accomplished.

Also, it can be seen that by mounting the food holding spit portion 18 horizontally on the walls of hide-away hood portion, I have been able to accomplish the object of having a barbecue device with a round fire tray that is covered by a removable hood wherein a food holding spit portion is positioned to hold food over the fire tray regardless of to what extent the fire tray is covered or exposed.

It should be understood that different shapes of hoods can be used to embody my invention and accordingly I feel my invention should not be limited to the shapes illustrated herein. It therefore stands to reason that it is possible to achieve the primary objectives of this invention by having a pair of hood portions that are of similar geometric configuration and having the same cooperation illustrated herein, to wit: the hide-away hood portion is slidably associated with the fixed hood portion and the hide away hood portion is rotatably movable about a coincident vertical axis of the hood portions, to either completely cover a portion of a round fire tray or expose it. For instance, hoods of similar geometric configuration such as conical, spherical, elliptical or parabolic configurations can be combined in the same manner as the semi-cylindrical hood portions to achieve the objectives mentioned herein.

Having thus so described my invention, I claim:

1. A barbecue device that can have a portion of its fire tray uncovered a predetermined amount without removing any parts therefrom, comprising: a fire tray having an open portion and a permanently closed portion, a fixed hood attached to said fire tray and extending therefrom and covering a portion of said fire tray to form a permanently closed fire tray portion, a movable hide-away hood portion with a wall to define the sides thereof and having a similar geometric configuration as said fixed hood portion that is sized to fit within said fixed hood portion, said hide-away hood portion being sized and movable from a position of being enclosed by said fixed hood portion to a position where it can cover said open portion of said fire tray to any extent including completely, and a rotatably driven food holding spit portion attached to the wall of said hide-away hood portion to hold food over said fire tray in all positions of said hide-away hood portion, whereby said barbecue device can have its open fire tray portion covered to any preselected extent and said hide-away hood portion can be moved to a position where it is received by said fixed hood portion when it is desired to have said open portion of said fire tray exposed.

2. A barbecue device, as defined in claim 1 wherein said hoods are slidably associated with one another, and said hide-away hood portion is rotatably movable about a vertical axis coincident with both of said hoods, whereby said movable hide-away hood can be rotatably moved to a predetermined position to cover a preselected portion of said open fire tray portion.

3. A barbecue device comprising: a circular fire tray having an open portion and a permanently closed portion, a fixed hood portion attached to said fire tray and extending from and covering a portion of said fire tray to form said permanently closed fire tray portion, a movable hide-away hood portion with a wall to define the side thereof that can be received by said fixed hood portion, a rotatably driven food holding spit portion attached to the wall of said hide-away hood portion to hold food over said fire tray in all positions of said hide-away hood portion, and receiving means for associating said hide-away hood portion with said top of said fire tray to enable said hide-away hood portion to be preselectively positioned to cover a portion of said open fire tray including all of it, said receiving means being disposed to enable said hide-away hood portion to rest thereon for support and be effectively positioned within said permanently closed fire tray portion, whereby said barbecue device can have its open fire tray portion covered to any preselected extent and said hide-away hood portion is received by said fixed hood portion when it is desired to have said open portion of said fire tray exposed.

4. A barbecue device comprising: a fire tray having a circular top with an open portion and a permanently closed portion, a semi-cylindrical fixed hood attached to said fire tray and extending from a portion of said top and covering a portion of said fire tray to form said permanently closed fire tray portion, a semi-cylindrical hide-away hood portion having a wall defining the side thereof and being of similar geometric configuration to said fixed hood portion attached thereto and associated therewith, a rotatably driven food holding spit portion having each of its ends attached to the wall of said hide-away hood portion and extending horizontally across said hide-away hood portion to hold food over said fire tray in all positions of said hide-away hood portion, receiving means for associating said hide-away hood portion with said top of said fire tray to enable said hide-away hood portion to be preselectively slidably positioned to cover certain portions of said open fire tray portion, said receiving means being disposed to enable said hide-away hood portion to be slidably positioned within said permanently closed fire tray portion, whereby said barbecue device can have its open fire tray portion covered to any preselected extent and said hide-away hood portion is received by said fixed hood portion when it is desired to have said open portion of said fire tray exposed.

5. A barbecue device, as defined in claim 4, wherein said semi-cylindrical hide-away hood portion is slidably associated with said fixed hood portion and is pivotally rotatably about a coincident vertical axis of both of said hoods, said food-holding spit portion extending through said coincident axis, and said receiving means is a channel member slidably associated with the bottom of said substantially semi-cylindrical hide-away hood portion, whereby said barbecue device can have its open fire tray portion covered to any preselected extent by rotating said hide-away hood portion about said coincident vertical axis to a certain position and said hide-away hood portion is received by said fixed hood portion when said hide-away hood portion is rotatably positioned to expose said open portion of said fire tray.

6. A barbecue device, as defined in claim 5, wherein said semi-cylindrical hide-away hood portion is pivotally attached at the top thereof with said semi-cylindrical fixed hood portion at said coincident vertical axis of both of said hoods, said semi-cylindrical hide-away hood portion having anti-friction means mounted on the bottom thereof and said anti-friction means are received by said channel member to enable said hide-away hood portion to be rotated around its axis with a minimum of friction.

7. A barbecue device comprising: a fire tray having a circular top with an open portion and a permanently closed portion, a semi-cylindrical fixed hood portion attached to said fire tray, said semi-cylindrical fixed hood portion having a closed end and an open end, said open end of said semi-cylindrical fixed hood portion being attached to a portion of said fire tray to form said permanently closed fire tray portion, a semi-cylindrical hide-away hood portion having a closed end and an open end, said semi-cylindrical hide-away hood portion being disposed with its walls in a parallel position with respect to said fixed hood portion, said semi-cylindrical hide-away hood portion being slidably associated with said fixed hood portion and said hide-away hood portion being rotatably mounted about the coincident vertical axis of said hood portions, said rotatable hide-away hood portion being sized to fit within said fixed hood portion, said hide-away hood portion being sized and rotatable to a position where it can cover said open fire tray portion to any extent including completely, a rotatably driven food holding spit means attached to said walls of said hide-away hood portion and being disposed to position food over said fire tray portion regardless of the extent to which said fire tray portion is covered, whereby said barbecue device can have its open fire tray portion covered to any preselected extent by rotating said hide-away hood portion which is received by said fixed hood portion when it is desired to have said open portion of said fire tray exposed.

8. A barbecue device as defined in claim 7, wherein said spit is in a substantially horizontal plane and passes substantially through the coincident vertical axis of said hood portions.

References Cited by the Examiner

UNITED STATES PATENTS

| | | | |
|---|---|---|---|
| 852 | 7/38 | Heermance | 126—299 |
| 2,314,248 | 3/43 | Rutledge | 126—25 |
| 2,588,046 | 3/52 | Ridgely | 99—421 |
| 2,792,773 | 5/57 | Barker | 126—25 X |
| 2,797,633 | 7/57 | Goodwin | 99—446 |
| 2,950,756 | 8/60 | Moloney | 160—91 |

ROBERT E. PULFRE, *Primary Examiner.*

LAWRENCE CHARLES, *Examiner.*